(12) United States Patent
Russell

(10) Patent No.: US 6,463,945 B1
(45) Date of Patent: Oct. 15, 2002

(54) UTILITY GRILL PAIL

(76) Inventor: Jeffrey V. Russell, 2030 E. 171st Ct., South Holland, IL (US) 60473

( * ) Notice: Subject to any disclaimer, the term of this patent is extended or adjusted under 35 U.S.C. 154(b) by 120 days.

(21) Appl. No.: 09/606,308

(22) Filed: Jun. 29, 2000

(51) Int. Cl.[7] .............................................. B08B 3/04
(52) U.S. Cl. ........................ 134/201; 134/110; 210/469; 210/474
(58) Field of Search ............................ 99/536; 210/464, 210/469, 473, 474; 134/109, 110, 115 R, 201; D7/667

(56) References Cited

U.S. PATENT DOCUMENTS

| | | | |
|---|---|---|---|
| 40,017 A | * 9/1863 | Barritt | 15/264 |
| 4,220,534 A | * 9/1980 | Perry | 210/232 |
| 4,226,255 A | 10/1980 | Tarrer | |
| 4,300,444 A | * 11/1981 | Muse | 99/352 |
| 4,486,911 A | * 12/1984 | Beke | 15/21.1 |
| 4,879,779 A | * 11/1989 | Zalevsky et al. | 15/104.92 |
| 4,979,255 A | * 12/1990 | Buchnag | 15/256.5 |
| 5,035,516 A | 7/1991 | Pacheco | |
| 5,178,761 A | * 1/1993 | Mohun | 126/369 |
| 5,722,711 A | * 3/1998 | German | 296/39.2 |
| 5,771,791 A | 6/1998 | Chen | |
| 5,988,190 A | * 11/1999 | Borges | 134/104.4 |
| 6,098,229 A | * 8/2000 | Ward | 134/186 |

* cited by examiner

Primary Examiner—Randy Gulakowski
Assistant Examiner—Joseph Perrin
(74) Attorney, Agent, or Firm—Henderson & Sturm LLP

(57) ABSTRACT

A utility grill pail for cleaning barbecue grills. The pail includes an open top container with a raised rib bottom. A perforated front lip extends inward from a front portion of the container sidewall. Side hand grip openings and a rear hand grip opening are formed in the sidewall near its upper edge. The rear hand grip opening carries two removable hooks that hold the barbecue grill while rinsing and draining. The pail holds a quantity of cleaning solution into which the grill may be placed to soak before scrubbing and cleaning.

14 Claims, 2 Drawing Sheets

6,463,945 B1

UTILITY GRILL PAIL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of cleaning containers, and more particularly to a cleaning container for a barbecue grill.

2. Description of Related Art

As can be seen by reference to the following U.S. Pat. Nos. 2,646,808; 4,226,255; 5,035,516 and 5,771,792, the prior art is replete with myriad and diverse cleaning containers.

While all of the aforementioned prior art constructions are more than adequate for the basic purpose and function for which they have been specifically designed, they are uniformly deficient with respect to their failure to provide a simple, efficient, and practical barbecue grill cleaning pail.

As a consequence of the foregoing situation, there has existed a longstanding need for a new and improved utility grill pail and the provision of such a construction is a stated objective of the present invention.

BRIEF SUMMARY OF THE INVENTION

Briefly stated, the present invention provides a utility grill pail for cleaning barbecue grills. The pail includes an open top container with a raised rib bottom. A perforated front lip extends inward from a front portion of the container sidewall. Side hand grip openings and a rear hand grip opening are formed in the sidewall near its upper edge. The rear hand grip opening carries two removable hooks that hold the barbecue grill while rinsing and draining. The pail holds a quantity of cleaning solution into which the grill may be placed to soak before scrubbing and cleaning.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
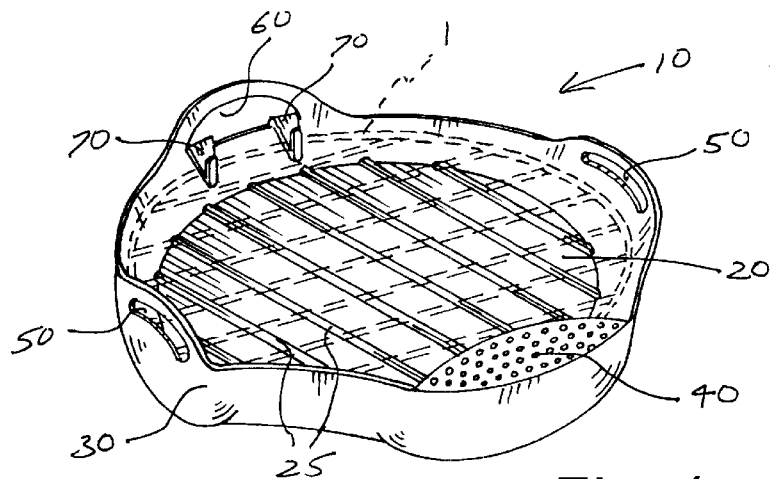
FIG. 1 is a perspective view of the utility grill pail of the present invention, with a barbecue grill shown in dashed line.
Figure 2:
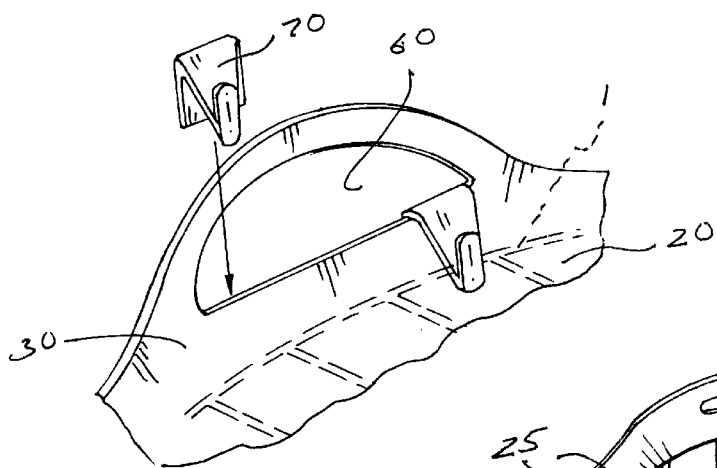
FIG. 2 is an enlarged partial perspective view showing the removable grill hooks being installed in the rear hand grip opening.
Figure 3:
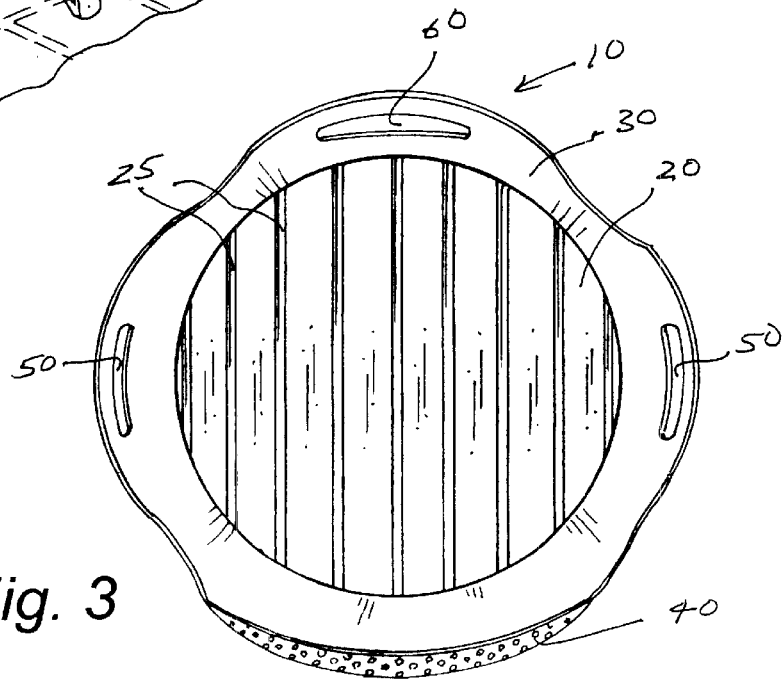
FIG. 3 is a top plan view of the utility grill pail.
Figure 4:
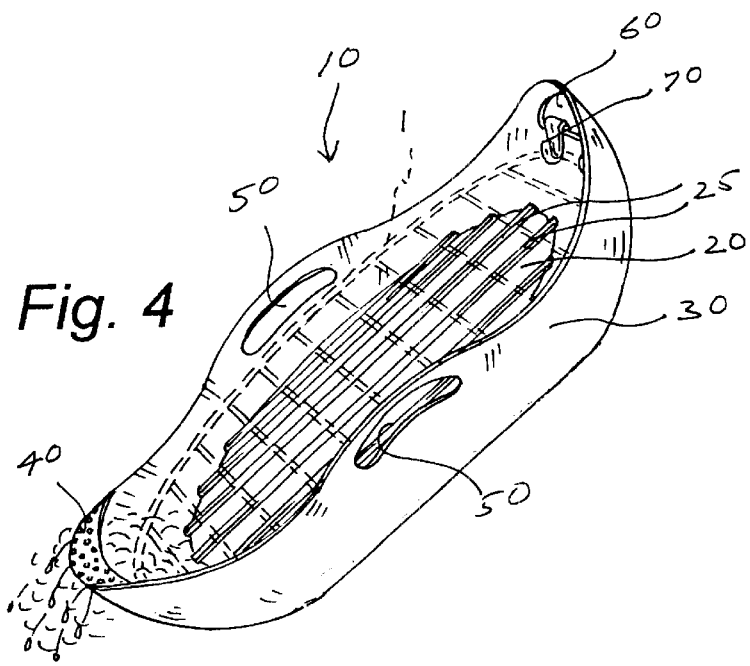
FIG. 4 is a perspective view of the pail illustrating liquids being poured through the perforated front lip and solid particles being retained within the pail.
Figure 5:
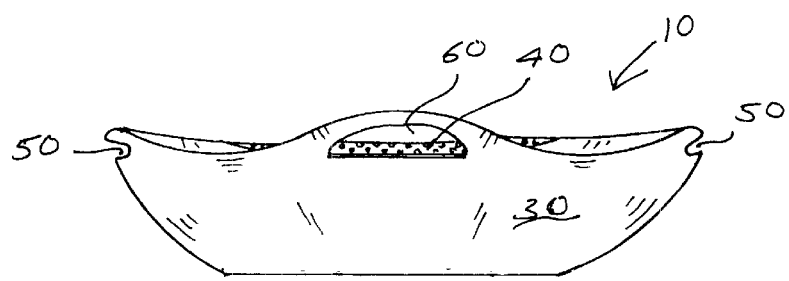
FIG. 5 is a rear elevational view of the pail.
Figure 6:
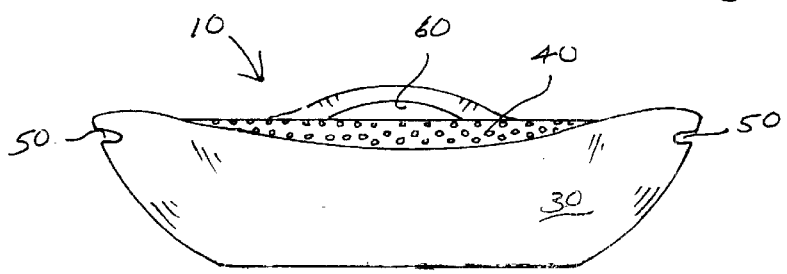
FIG. 6 is a front elevational view thereof.

As can be seen by reference to the drawings, and in particularly to FIG. 1, the utility grill pail that forms the basis of the present invention is designated generally by the reference number 10. The pail 10 includes an open top container with a bottom 20 and an upwardly extending side wall 30. The bottom 20 carries a number of spaced parallel raised ribs 25. A perforated front lip 40 extends in from the front of the side wall 30, and side hand grip openings 50, and a rear hand grip opening 60 are formed through the side wall 30 near its upper edge. A pair of removable grill hooks 70 attach in the rear hand grip opening 60 (FIG. 2) to hold a barbecue grill 1.

The pail 10 is designed to make cleaning barbecue grills 1 easier. The grill 1 sits flat in the pail 10. The bottom 20 of the pail 10 has raised ribs 25 for better cleaning of the barbecue grill 1. The front lip 40 of the pail 10 has perforations or drain holes for pouring out liquids, and catching particles left behind from barbecue grill 1. The pail 10 has two side handles 30 and one rear handle 60 where two removable hooks 70 can be placed to hold the barbecue grill 1 while rinsing and draining. The pail 10 holds cleaning solution so the barbecue grill 1 can easily be submerged in solution for better scrubbing and cleaning. It is to be understood that the outside bottom of pail 10 may have some form of a non-slip surface or feet. Cleaning barbecue grills 1 is a messy job and the utility grill pail 10 controls the entire cleaning process.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A barbecue grill cleaning pail comprising
an open container dimensioned to receive a barbecue grill and including a bottom and a sidewall extending up from the bottom, the bottom having a plurality of parallel spaced raised ribs for supporting a barbecue grill above the bottom;
a horizontally disposed perforated lip disposed to extend inward from a front portion of the sidewall; and,
at least one hand grip opening formed in the sidewall adjacent an upper edge thereof.

2. The cleaning pail as in claim 1; wherein said at least one hand grip opening is formed in a rear portion of the sidewall.

3. The cleaning pail as in claim 1 further comprising
means for suspending a barbecue grill at an angular orientation relative to the bottom of the container.

4. The cleaning pail as in claim 3; wherein, said at least one hand grip opening is formed in a rear portion of the sidewall.

5. The cleaning pail as in claims 4; wherein, said means for suspending a barbecue grill at an angular orientation relative to the bottom of the container includes at least one grill hook suspended from said at least one opening.

6. The cleaning pail as in claim 5 further comprising
a pair of side hand grip openings formed in opposing lateral portions of the sidewall adjacent an upper edge thereof.

7. The cleaning pail as in claim 3; wherein, said means for suspending a barbecue grill at an angular orientation relative to the bottom of the container includes at least one grill hook suspended from said at least one opening.

8. The cleaning pail as in claim 7; wherein, said at least one grill hook is removably associated with said at least one hand grip opening.

9. The cleaning pail as in claim 8; further comprising
pair of side hand grip openings formed in opposing lateral portions of the sidewall adjacent an upper edge thereof.

10. A barbeque grill cleaning pail comprising
an open container dimensioned to receive a barbeque grill and including a bottom and a sidewall extending up from the bottom which is further provided with a plurality of raised ribs for supporting a barbeque grill above the bottom;

at least one hand grip opening formed in the sidewall adjacent an upper edge thereof; and, means for suspending a barbeque grill at an angular orientation relative to the bottom of the container.

11. The cleaning pail as in claim 10; wherein, said means for suspending a barbecue grill at an angular orientation is operatively associated with said sidewall.

12. The cleaning pail as in claim 10; wherein, said means for suspending a barbeque grill at an angular orientation is operatively associated with said at least one opening.

13. The cleaning pail as in claim 12, further including a pair of side hand grip openings formed in opposing lateral portions of the sidewall adjacent an upper edge thereof.

14. The cleaning pail as in claim 13, further including a horizontally disposed perforated lip disposed to extend inward from a portion of the sidewall.

* * * * *